United States Patent [19]  [11] 4,013,601
Alford  [45] Mar. 22, 1977

[54] WATER-DILUTABLE POLYAMIDE RESINS AND WATER-DILUTABLE EPOXY RESIN COMPOSITIONS CONTAINING SAID POLYAMIDE RESINS

[75] Inventor: John A. Alford, Hanahan, S.C.
[73] Assignee: Westvaco Corporation, New York, N.Y.
[22] Filed: July 31, 1975
[21] Appl. No.: 600,285
[52] U.S. Cl. .............................. 260/18 PN; 260/13; 260/18 EP; 260/18 N; 260/31.2 N; 260/824 EP; 260/830 P; 260/834; 260/836
[51] Int. Cl.² .................... C08J 3/06; C08L 63/10; C08L 77/06
[58] Field of Search ............... 260/29.2 EP, 29.2 N, 260/830 P, 18 N, 18 EP, 18 PN, 824 EP, 13, 836, 31.2 N

[56] References Cited
UNITED STATES PATENTS

| | | | |
|---|---|---|---|
| 2,811,495 | 10/1957 | Wittcoff et al. | 260/29.2 EP |
| 2,899,397 | 8/1959 | Aelony et al. | 260/29.2 EP |
| 3,584,072 | 6/1971 | Winslow | 260/29.2 N |
| 3,694,390 | 9/1972 | Winslow | 260/29.2 N |
| 3,758,421 | 9/1973 | Nikles | 260/29.2 EP |

Primary Examiner—Allan Lieberman
Attorney, Agent, or Firm—Richard L. Schmalz; Ernest B. Lipscomb, III

[57] ABSTRACT

There are disclosed herein water-dilutable reactive polyamide resins suitable for curing epoxy resins in aqueous systems. The polyamide resins are made by reacting together a $C_{21}$-cycloaliphatic dicarboxylic acid of the formula

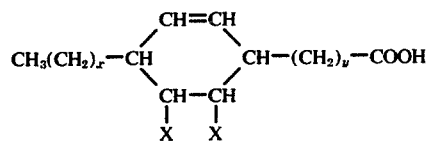

wherein $x$ and $y$ are integers from 3 to 9, $x$ and $y$ together equal 12, X is a member of the group consisting of H and COOH with one X of each moiety and a polyamine of the group diethylene triamine, triethylene tetramine and tetraethylene pentamine. These polyamide resins are soluble when water is added to the resin in amounts up to at least 45% by weight.

8 Claims, No Drawings

WATER-DILUTABLE POLYAMIDE RESINS AND WATER-DILUTABLE EPOXY RESIN COMPOSITIONS CONTAINING SAID POLYAMIDE RESINS

BACKGROUND OF THE INVENTION

1. Field of the Invention

This invention relates to reactive polyamide resins and especially organic solvent-free polyamide resins for curing epoxy coating resins. More particularly, this invention relates to polyamide resins made from a $C_{21}$-cycloaliphatic dicarboxylic acid that are soluble up to about 45% by weight when water is added to the resin.

Epoxy resin surface coatings hardened with reactive polyamide resins have achieved continued growth due to their excellent resistance to corrosion and strong chemicals, their good adhesion properties, and their resistance to abrasion, impact, and other physical abuse. The largest use for epoxy surface coatings is coatings for cans and closures. Despite the advantages, epoxy coatings have the disadvantage of needing organic solvents during application. Although water-dispersible epoxy resin coating systems have been developing slowly, there remains in these systems need for an organic solvent to solubilize the polyamide resin prior to dispersion in water. Also, these systems require dispersants and emulsifiers harmful to the properties of the hardened coating.

2. The Prior Art

Efforts to obtain epoxy coating using polyamide resins in aqueous systems are represented by U.S. Pat. No. 2,811,495 to Wittcoff et al. which discloses first solubilizing a polyamide resin and an epoxy resin separately in an organic solvent and then dispersing the solubilized resins into water. U.S. Pat. No. 2,899,397 to Aclony et al. also discloses mixed aqueous emulsions of polyamide resins and epoxy resins solubilized with hydroxylic solvents and then dispersed in water.

This invention provides a method of eliminating the need for an organic solvent by using a particular dibasic acid and a method of solubilizing. The polyamide resin used in the method of this invention is disclosed in British Pat. No. 1,046,208 to Crawford et al. The polyamide resins of Crawford et al. were found to be satisfactory hardening agents for epoxy resins and were diluted with organic solvents.

It is the general object of this invention to provide a process for making water-dilutable reactive polyamide resins.

Another object of this invention is to provide an organic solvent-free method for producing epoxy resin surface coatings.

Other objects, features and advantages of this invention will be apparent from the foregoing detailed description of the invention.

SUMMARY OF THE INVENTION

It has been found that it is possible to produce polyamide resin-epoxy resin coating in an aqueous system without organic solvents. In one aspect of this invention, it has been found that a polyamide resin produced by reacting a $C_{21}$-cycloaliphatic dicarboxylic acid of the formula

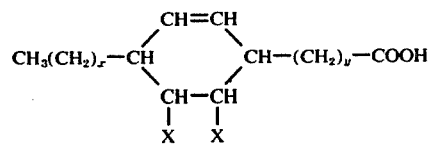

wherein $x$ and $y$ are integers from 3 to 9, $x$ and $y$ together equal 12, X is a member of the group consisting of H and COOH with one X of each moiety and a polyamine is water-dilutable when water is added to the resin up to about 45% by weight. At solubilities above about 45% by weight, stable emulsions are formed when water is added to the resin. In another aspect of this invention, it has been found that the water-dilutable polyamide resins may be used to cure epoxy resin for surface coatings in aqueous systems.

DETAILED DESCRIPTION OF THE INVENTION

The reactive polyamide resins are derived from the $C_{21}$-cycloaliphatic dicarboxylic acid and polyamines described in British Pat. No. 1,046,108. The $C_{21}$-cycloaliphatic dicarboxylic acid is obtained from the Diels-Alder reaction of linoleic acid and acrylic acid as described in U.S. Pat. No. 3,753,968 or British Pat. 1,032,363 and has the following general formula

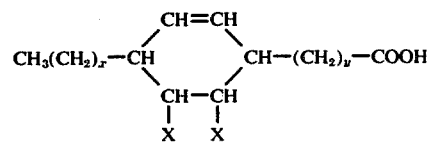

wherein $x$ and $y$ are integers from 3 to 9, $x$ and $y$ together equal 12, X is a member of the group consisting of H and COOH with one X of each moiety.

The polyamines include, for example, diethylene triamine, triethylene tetramine and tetraethylene pentamine. The amount of dicarboxylic acid to polyamine may be varied somewhat to give polyamide having either an excess of terminal amine groups to react more readily in curing epoxy resins or an excess of terminal carboxyl groups to retard curing epoxy resins. The amount of $C_{21}$-cycloaliphatic dicarboxylic acid to polyamine is usually from 1.5:1 to 3:1. Generally, the polyamide resins used for rapid curing of epoxy systems should have an amine number above 50 and preferably from 150–400 with a low acid number.

In the preparation of epoxy-polyamide cured coating systems, water is added to the polyamide resin and is solubilized therein. It is essential and critical that the water be added to the resin. When the resin is added to water, little if any solubilization occurs. It should also be noted that dimer acid-based polyamide resins do not dissolve appreciably in water. The $C_{21}$-cycloaliphatic dicarboxylic acid-based polyamide resin is soluble in water up to about 45–55% by weight. In most uses, a solids concentration of from 10% to 50% by weight of the resin is preferred.

To obtain clear solutions at low solids content, it was found desirable to add from 0.25% to 25%, preferably from 1% to 10%, by weight of an organic acid or an inorganic acid. Exemplary acids include those such as acetic, proprionic, hydrochloric or the $C_{21}$-cycloaliphatic dicarboxylic acid described above. Although the particular aicd used is not critical, acetic acid is one of the preferred acids. By varying the amount of acid added, the pot life of the hardener-epoxy system may be varied from a few minutes to several hours and still maintain reasonable film cure times.

The water-diluted solutions of reactive polyamide resin may then be mixed with water-insoluble epoxy resins to form stable emulsions.

The epoxy resins used in this invention are primarily of the epichlorohydrin-Bisphenol-A type, but epoxy resins of any type may be used. The preferred epoxy resins are the liquid or low melting solids type having epoxy equivalent of 180–220 for the liquids and 425–770 for the solids. The water-dilutable polyamide-epoxy resin coating compositions of this invention are generally, 5–40% by weight of the epoxy resin, 5–40% by weight of the polyamide resin hardener and 5–90% water. Generally, the more dilute the coating system, the faster the drying it becomes.

Of equal importance is the finding that water solutions of the acid treated reactive polyamides emulsify epoxy resins and obviate the need for additional emulsifiers. The presence of an aemulsifier weakens the chemical and physical properties of cured epoxy resins and accounts in large measure for the unsatisfactory properties of water-based systems.

The ability of acids to impart water solubility to the reactive polyamides and to produce self-emulsifiable epoxy resin mixtures can be rationalized in terms of the production of cationic sites by protonation of some of the amine groups along the polymeric chain. However, the water-dilutability of the polyamides greatly enhances these properties. For example, treatment of the dimer acid-based polyamide with large amounts of acid produces a product which is only slightly water-soluble and does not emulsify well with epoxy resins.

Few additives are used in the typical epoxy surface-coating system. Exceptions are pigments, pigment dispersing aids (e.g., urea resins), flow control agents (e.g., activated colloidal silica), and agents that eliminate pinholing and cratering (e.g., ethyl cellulose, silicone resins, and polyvinyl butyral). In solution coatings for automotive primer applications, 3–5% of ureaformaldehyde resin is added to improve the corrosion resistance of the final film. In another type of solution primer application based on a reactive, polyamide resin, unmodified epoxy resin, 20–30% of a reactive acrylic resin is added to the formulation to reduce smoke and fumes in the baking oven. Exopy resins usually require metal soap driers to effect proper air oxidation of unsaturated fatty acid side chains, and epoxy resin emulsions may require defoamers, preservatives, freeze-thaw stabilizers, thickeners or coalescing aids.

The advantages of the water-dispersed solutions are manifold. First of all, there are the advantages in water-based dispersions such as, elimination of the use of expensive solvents, elimination of solvent toxicity and fire hazards, less impregnation of films into porous surfaces such as paper, and easier handle-ability. One of the important advantages of these systems, however, is the increase which is observed in the pot life of the polyamide-epoxy resins combinations. Surprisingly, the emulsions themselves are indefinitely stable even after the two resins start to interact. Not only do these emulsions have good shelf stability, but they are uniquely stable at extremely low solids contents, i.e., 1%. Their mechanical stability is also excellent.

Another advantage of the water-based polyamide resin systems of this invention is the ease with which viscosity of the final product may be controlled. Not only is the viscosity dependent on solids concentration, as might be expected, but also it is dependent on the quantitiy of acid present. Thus, if a viscous paste is desired for wet stick adhesives, a smaller quantity of acid may be used. If, on the other hand, a fluid system is required, more acid is employed. Surprisingly, the variability of viscosity is opposite that of dimer fatty acid-based polyamide resins. The precise concentrations of acid depend on the particular system, i.e., the specific polyamide, the specific epoxy resin and the specific acid which is being used.

Numerous uses may be described for these systems. These uses include coating of food and beverage cans, automotive primer coatings, and architectural industrial maintenance just to name a few.

The following examples are illustrative of the practice of this invention.

EXAMPLE 1

This example illustrates the water-dilutability of the $C_{21}$-cycloaliphatic dicarboxylic acid-based polyamide resin. A polyamide resin was made by reacting 800 grams of $C_{21}$-cycloaliphatic dicarboxylic acid with 408 grams of diethylene triamine by heating at a rate of 1.5° F. per minute to a maximum temperature of 482° F. at the end of a 4-hour period to produce the polyamide resin. Water was dissolved in the polyamide resin to give clear solutions at concentrations of water up to 45–55%. At concentrations above 45–55%, stable homogeneous emulsions of resin and water were formed. In order to obtain these solutions or stable emulsions, it was necessary to add the water to the resin. The addition of the resin to water gave poor emulsions which separate quickly on standing.

EXAMPLE 2

A polyamide resin was prepared from 800 grams of $C_{21}$-dicarboxylic acid reacted with 428 grams of triethylene tetramine by heating at a rate of approximately 1.5° F. per minute to a maximum temperature of 482° F. at the end of a 4-hour period. Water was found to dissolve in the polyamide resin at concentrations up to 50–55%. To the diluted resin was added 52.0 grams of acetic acid to give clear, pourable solutions which were infinitely dilutable with water.

EXAMPLE 3

Samples of the polyamide resins (30 g. of emulsion at 33⅓% solids) from Example 1 were mixed with 10 grams of a commercial water-insoluble epoxy resin (Epotuf Epoxy Resin 37–140, a diglycidyl ether of Bishpenol-A) to give stable emulsions at 50% solids. Coatings of this material painted on aluminum pans cured overnight at room temperature gave transparent, hard, tough films identical in appearance to those obtained from non-aqueous epoxy systems. Thick films (approximately ⅛ inch) gave yellowish opaque films of similar properties. When cured in bulk in a cone shaped paper cup, the mixtures gave a very hard tough yellow solid with no noticeable shrinkage and encapsulation of the entrained water. The cured systems show good adhesive properties.

A dimer acid-based polyamide resin was substituted for the polyamide resin of Example 1 and did not dissolve appreciable water or form stable emulsions.

EXAMPLE 4

A number of reactive polyamides from the $C_{21}$-cycloaliphatic dicarboxylic acid using diethylene triamine, triethylene tetramine and tetraethylene pentamine were produced using the procedure of Example 1. These reactive polyamide resins were measured for dilutability by water and amine values. A list of the reactive polyamides is shown in Table I.

TABLE I

| Polyamide Sample No. | Amine Used[1] | Amine Value | Dilutable To, % Solids |
|---|---|---|---|
| 1 | TETA | 276 | 50 |
| 2 | DETA | 325 | 50 |
| 3 | TEPA | 365 | 55 |
| 4 | TETA | 308 | 50 |
| 5 | TETA | 305 | 50 |
| 6 | DETA | 297 | 50 |
| 7 | DETA | 269 | 45 |
| 8 | DETA[2] | 272 | 45 |
| 9 | TETA | 401 | 55 |
| 10 | DETA[2] | 215 | 45 |
| 11 | TEPA | 342 | 55 |

Notes:
[1]DETA = diethylene triamine
TETA = triethylene tetramine
TEPA = tetraethylene pentamine
[2]This $C_{21}$-cycloaliphatic dicarboxylic acid was 60% by weight of the acid and about 40% by weight oleic acid.

As the results show, all of the reactive polyamide was water-dilutable in the 45% to 55% range. A polyamide resin prepared by the same method using dimer acid (Empol 1018) had an amine value of 186 and showed no noticeable water dilutability. Each of samples 1–11 cured commercially available epoxy resins, e.g., Epotuf 37–140, Epi-Reza 510, Epi-Rez 5060 or Epon 828.

EXAMPLE 5

This example illustrates the effect of acid addition on pot life. The following formulation at 25% solids was made for testing. Mixed together were 24.3 grams of the polyamide resin of Sample No. 4 in Example 4 (at 50% solids in water) with 12.85 grams of epoxy resin (Epotuf 37–140) and 62.85 additional grams of water. Various amounts of acetic acid were added to the formulation. The effects on pot life are shown in Table II.

TABLE II

| Formulation No. (25% Solids) | Acetic Acid Added to Hardnener (wt. %) | Pot Life (Hr.) |
|---|---|---|
| I | 1.5% | Incompatible at 75% Water |
| II | 2.5% | 0.67 |
| III | 3.5% | 8.0 |
| IV | 4.5% | 8.25 |
| V | 5.5% | 11.5 |
| VI | 10.0% | 54 |
| VII | 25.0% | >72 |

The results show the extended pot life with the addition of acetic acid.

EXAMPLE 6

Pigmented solutions of the reactive polyamides were prepared. These blend well with epoxy resins to produce very white creamy emulsions which when spread as films produce hard coatings. The following formulation is typical and has a pot life of 8 hours.

| Pigmented Hardener | Epoxy Resin |
|---|---|
| 9.53 parts 3846-5 | 10 parts Epotuf 37–140 |
| 0.40 parts acetic acid | |
| 77.36 parts water | |
| 13.11 parts titanium dioxide | |

The films had an average pencil hardness of 2H to 4H. Baking of these films at 212° F. for ½ hour increased the chemical resistance and increased the pencil hardness to from 4H to 6H.

While the invention has been described and illustrated herein by reference to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:
1. A method of producing a water-dilutable reactive polyamide resin comprising;
    a. reacting a $C_{21}$-cycloaliphatic dicarboxylic acid of the formula

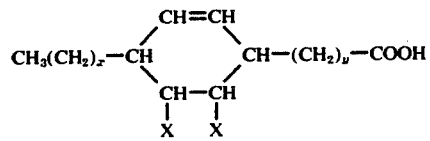

wherein $x$ and $y$ are integers from 3 to 9, $x$ and $y$ together equal 12, X is a member of the group consisting of H and COOH, with one X of each moiety and a polyamine selected from the group consisting of diethylene triamine, triethylene tetramine and tetraethylene pentamine to form a polyamide resin, said $C_{21}$-cycloaliphatic dicarboxylic acid to polyamine being in a weight ratio from 1.5:1 to 3:1. and
    b. adding water up to about 55% to said polyamide resin.
2. The method of claim 1 wherein from 0.25% to 25% by weight of an acid is added to said water-dilutable polyamide resin.
3. The method of claim 2 wherein from 1% to 10% by weight of acetic acid is added to said water-dilutable polyamide resin.
4. A water-dilutable coating composition comprising;
    a. 5–90% by weight of water as a solvent component,
    b. 5–40% by weight of an epoxy resin,
    c. 5–40% by weight of a polyamide resin produced by reacting a dibasic acid of the formula

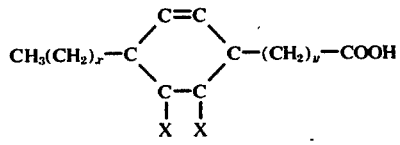

wherein $x$ and $y$ are integers from 3 to 9, $x$ and $y$ together equal 12, X is a member of the group consisting of H and COOH with one X of each moiety and a polyamine selected from the group consisting of diethylene triamine, triethylene tetramine and tetraethylene pentamine, said dibasic acid to polyamine being in a weight ratio from 1.5:1 to 3:1,
 d. said water being added to said polyamide resin to form a solution, and
 e. said polyamide resin solution being mixed with said epoxy resin to form a stable emulsion.

5. The water-dilutable coating composition of claim 4 wherein said epoxy resin is of the Bisphenol-A type.

6. The method of claim 4 wherein from 0.25% to 25% by weight of an acid is added to said polyamide resin solution.

7. The method of claim 4 wherein from 1% to 10% by weight of acetic acid is added to said water-dilutable polyamide resin.

8. The method of claim 1 wherein said water is added to said polyamide resin in an amount from 10% to 50% by weight of said resin.

* * * * *